3,674,577
FABRICATION OF STEEL STRUCTURES BY WELDING
Joachim Degenkolbe, Mulheim, and Bruno Musgen, Oberhausen, Germany, assignors to Huttenwerk Oberhausen AG, Oberhausen, Germany
Filed Sept. 18, 1969, Ser. No. 859,022
Claims priority, application Germany, Sept. 20, 1968, P 17 83 028.3
Int. Cl. C21d 1/00; B23p 11/00
U.S. Cl. 148—143
3 Claims

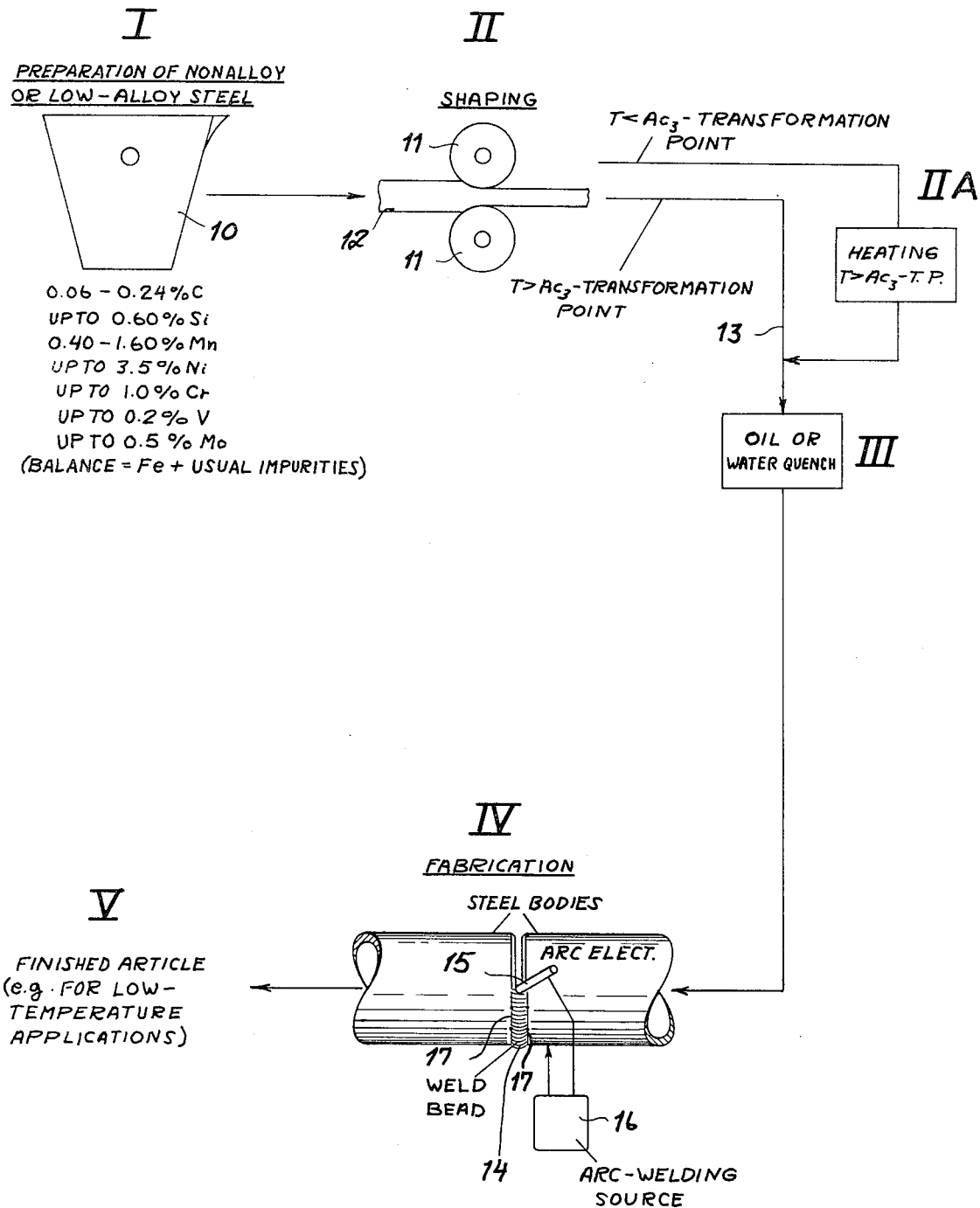

ABSTRACT OF THE DISCLOSURE

A welded steel structure, especially for low temperature or cryogenic installations, consisting of water-quenched or oil-quenched (tempered or hardened) steel bodies of the following composition by weight:

0.06 to 0.24% carbon;
up to 0.60% silicon;
0.40 to 1.60% manganese;
up to 3.5% nickel;
up to 1.0% chromium;
up to 0.20% vanadium;
up to 0.5% molybdenum; and
balance iron.

Upon welding the body is found to be free from a ductility or toughness minimum, as measured by the notched-body impact technique or drop-weight test at a location from about 3–10 mm. from the weld seam.

---

Our present invention relates to improvements in the fabrication of steel structures and especially the formation of welded assemblies from steel plates, tubes, bands, bars and the like which may be used in low-temperature technology and installations. More particularly, the instant invention relates to the use of nonalloyed or low alloy structural steels for the formation of welded structures.

It has been proposed heretofore to provide nonalloyed or low alloy steels for welding fabrication into load-bearing and stress-resistant structures. Typical steel compositions for this purpose are the structural steels described in German Industrial Standard DIN 17006. Upon the welding of such steels, there is a characteristic modification of the lattice and grain structure of the steel bodies in the region adjoining the weld seam or bead as a consequence of the heat and high temperatures associated with the welding process.

By controlling or establishing the various welding parameters in accordance with the alteration of the gram or lattice structure described in the adjoining zones, it is possible to establish a desired grain characteristic and, therefore, select mechanical qualities of the regions of the weld seam with facility. Thus the electrode type, the welding current, the welding voltage, the metal-deposition speed and bead formation may be preselected to obtain desired results in part of the heat-affected zone immediately adjoining the weld seam. For instance, it is possible to bring the temperature in the zone, as a result of welding, above the $Ac_3$ transformation point, i.e. into the supercritical range, thereby producing a fine grain ductile and tough metallurgical structure or lattice.

However, in regions up to about 10 mm. from the weld seam (i.e. laterally of the weld line to a distance of about 10 mm.) there is no grain alteration noticeable under conventional microscopic examination, but a detrimental action appears as a consequence of the fact that the temperature, during welding, does not exceed the lower transformation point, hereafter referred to as the $Ac_1$ transformation point in accordance with the terminology commonly used in connection with the phase diagrams of nonalloyed or low alloy steels.

The detrimental action is manifested as a reduction in the ductility or toughness, e.g. as measured by the notched bar (body) impact test procedure or drop weight test of Pellini, apparent in the form of a subcritical embrittlement such that this region, somewhat spaced from the weld seam, may have a notched bar impact toughness value which may be 50% below the corresponding value of the base material. This phenomenon is discussed by Cabelka in Schweisstechnique, vol. 4, pages 35–43 (1954). The embrittlement has also been characterized as "weld-decay embrittlement" in the literature.

The subcritical weld-decay embrittlement mentioned above appears to occur independently of the chemical composition of the workpiece and can be found in fine grain steel to the same extent as it occurs in coarse grain steel, i.e. in steel which has not been deoxidized with aluminum or other fine-grain forms. Furthermore, the subcritical embrittlement is observed in hot rolled or hot-formed steels as well as in materials which have been subjected to conventional annealing techniques as well as materials which are permitted to cool in the course of annealing. It has also been found that such subcritical weld-decay embrittlement occurs to the same extent with manual arc welding using arc-welding rods as electrodes and with submerged arc welding or welding in which the weldment is deposited with the aid of a welding powder. Finally, it is observed that the weld-decay embrittlement cannot be controlled by the welding parameters such as the type of electrode and the welding current and that both the preheating or after annealing of the weld appear to be without effect upon the deterioration defined as well-decay embrittlement.

In all high-stress welded constructions, for example, storage vessels, pressure containers, pipe lines, pressure conduits, bridges, multistory steel structures and vehicles, the loss of ductility and toughness associated with weld-decay embrittlement can result in considerable difficulties in, on the one hand necessitating the use of alloy steels at relatively high cost, requiring the substitution of materials of greater thickness. On the other hand, to obtain the desired load factors involves increased weight.

Of special significance is the fact that embrittlement is most detrimental in low-temperature installations in which the failure rate increases as the use temperature is reduced. It is not uncommon, therefore, for low alloy steels to be excluded from use in low-temperature installations because of the weld-decay embrittlement and, instead, for alloys to be employed which contain high proportions of nickel and other expensive alloy elements.

It is, therefore, the principal object of the present invention to provide a material of the steel family which can be used at relatively low cost and with great facility in the welding fabrication of steel structures without weld-decay embrittlement and loss of the ductility and toughness characterizing low alloy or nonalloyed steels.

A further object of this invention is to provide a method of rendering low alloy or nonalloyed steels suitable for welding for fabrication of stress-resistant steel structures so that the resulting structure is free from the weld-decay embrittlement and decreased ductility characterizing earlier systems.

It is another object of this invention to provide a method of fabricating steel structures, especially for low-temperature installations, in which the disadvantages of earlier systems can be obviated and the resulting structures can be of high strength and low cost.

Still another object of our invention is the provision of a steel capable of being welded into stress-resistant structures without weld-decay embrittlement and the decreased ductility and toughness associated therewith.

These objects and others which will become apparent hereinafter are attained in accordance with the present invention, by the use of nonalloyed or low alloy steel and especially steel having the following composition by weight:

0.06% to 0.24% carbon,
up to 0.60% silicon,
0.40% to 1.60% manganese,
up to 3.5% nickel,
up to 1.0% chromium,
up to 0.20% vanadium,
up to 0.5% molybdenum, and the balance iron;

and subjecting the steel bodies to tempering or hardening prior to welding, which involves a quenching of the body in liquid (i.e. water or oil) from a temperature above the upper transformation point, i.e. above the $Ac_3$ point for steels of the aforedescribed composition.

Thus the present invention contemplates the use of nonalloyed or low alloy structural steels, which have been subjected to heating to a temperature in the region of or above the upper transformation point and rapid cooling by quenching in water or oil, for welded structures requiring high ductility and toughness coefficient in the region of the weld seam, and moreover, under conditions of extreme cold, e.g. in low temperature or cryogenic installations.

To determine the low-temperature usefulness of metal bodies, it is of interest to refer to the nil-ductility-transition temperature or NDT temperature. This may be defined as the temperature, as described in ASTM E208–63T, below which incipient fissure formation commences upon subjecting of a notched specimen, in which a crack-starter weld bead is deposited, to drop-weight testing. A break may then be expected above the NDT temperature of the material.

Preferably the steel of the invention has the composition given above and contains less than 6% by weight, in total, of nickel, chromium, vanadium and molybdenum. For the purposes of this specification, a low-alloy steel will be considered a structural steel containing from trace amounts to 6.0% by weight of nickel, chromium, vanadium and molybdenum and a maximum of 3.5% nickel, 1.0% chromium, 0.20% vanadium and 3.5% molybdenum. A nonalloyed structural steel within the composition set forth above may contain less than 0.05% phosphorus, sulfur or aluminum and contains the most trace amounts of nickel, chromium, vanadium and molybdenum.

Surprisingly with steels of the aforedescribed composition, subcritical weld-decay embrittlement and loss of ductility does not occur in a heat-affected zone adjacent a weld seam as noted above when the steel is subjected to tempering or hardening prior to welding, by rapid quenching from the temperature above the upper transition temperature range (i.e. the $Ac_3$ point) to a temperature below the lower transition temperature range (the $Ac_1$ point) in a water or oil bath. The steel body to be welded during fabrication may be simply quenched after formation of the desired body configuration (i.e. after casting or rolling) or may be heated to the temperature above the $Ac_3$ point prior to rapid cooling. In most instances water quenching of the heated body will suffice although, in many cases, it has been found desirable to subject the heated body to quenching in oil during the hardening process. Although the adjacent zone is heated, there occurs no substantial decrease in ductility or increase in embrittlement and, in fact, it is frequently found that the ductility and toughness in the heat-affected zone will increase as a result of the welding step. In other words as a result of the welding process, the weld seam and the adjoining heat-affected zone (HAZ) have substantially the same stress resistance and toughness as the unaffected base metal. This phenomenon has been found to be especially important when the welded structure is to be subjected to stress at low temperatures as, for example, in cryogenic installations.

The above and other objects, features and advantages of the present invention will become more readily apparent from the following description and specific examples reference being made to the accompanying drawing, the sole figure of which is a diagram illustrating the method of the present invention.

In the drawing we show at I the preparation of a nonalloyed or low alloy steel as made, for example, in a ladle 10. After preparation of the steel, the latter may be cast or otherwise subjected to shaping (stage II), e.g. in a rolling mill 11 the slab 12 of which may be formed into a pipe for use in low temperature installations. If the emergent body is at a temperature above the $Ac_3$ transformation point, it may be subjected to an oil or water quench (stage III) as represented by line 13. More commonly, however, the body may be permitted to cool after performing in which case it may be heated thereafter (stage IIA) and subjected to the oil or water quench in step III. Fabrication occurs, as represented in stage IV, by welding two of the steel bodies together along a weld bead 14 with a rod-type arc welding electrode to one terminal of the welding current source 16, the other pole of which is returned to the steel bodies. The finished body (stage V) is free from loss of toughness and ductility in the heat-affected zone 17 adjoining the weld line.

EXAMPLE I

A steel slab with the following composition by weight:

| | Percent |
|---|---|
| Carbon | 0.10 |
| Silicon | 0.26 |
| Phosphorus | 0.014 |
| Sulfur | 0.016 |
| Aluminum | 0.012 |
| Manganese | 1.2 |

Balance iron.

The body is heated to a temperature above its $Ac_3$ point and water quenched and then subjected after welding to a comparison with an unquenched or conventionally annealed body of the same composition to determine the difference in ductility and toughness of the HAZ. In the following table the physical characteristics in terms of strength are given in the first column, the notched bar impact strength is given in the second column at several points spaced by the indicated distances from the weld line in the second column and the NDT temperature in ° C., as determined under ASTM E208–63T is given at various distances from the weld line in millimeters.

TABLE I

| Heat treatment | Physical properties | | | Notched bar impact strength (kgm./cm.²) distance from weld line (mm.) | | | | | NDT-temperature (° C.), distance from weld line (mm.) | | | | |
|---|---|---|---|---|---|---|---|---|---|---|---|---|---|
| | $\sigma_S$ | $\sigma_B$ | $\delta_5$ | 0 | 3 | 6 | 10 | 100 | 0 | 3 | 6 | 10 | 100 |
| Conventional annealing | 32 | 47 | 31 | 6 | 3 | 1.5 | 4.5 | 6 | −15 | −20 | −25 | −40 | −50 |
| Water-quenched | 36 | 49 | 32 | 5 | 6 | 9 | 9 | 8 | −80 | −80 | −75 | −75 | −75 |

The tests show, when using normally and yield steel, there exists a clear minimum in the notched bar impact strength at about 6 mm. from the weld seam. By contrast, with the steel body subjected to tempering and quenching in water, in accordance with the present invention, this minimum is not observed but, on the other hand, there is a slight increase in the notched bar impact strength. In the region of the weld line and at some distance therefrom, the unquenched body manifests deterioration of the grain structure but the subcritical zone remains apparently unaffected.

The investigations into the characteristics of the heat affected zone adjacent the weld seam were carried out by the notched bar impact and notched bar bending methods with variations of the location of the effective test. It will be self-understood that the embrittlement of lack of weld-decay embrittlement can be determined by other techniques as well and of special interest in the Pellini drop by test of the previously mentioned ASTM standard. The dry weight test shows substantially identical results with a shift of 25 to 30° between the NDT temperature in the range of 3 to 6 mm. from the weld seam to the base metal with the conventionally annealed material while the water quenched body shows no significant change in the NDT temperature over the heat-affected zone and, indeed, a much lower NDT.

EXAMPLE II

As described with respect to Example I, a steel body of the low alloy type was prepared with the following composition by weight:

| | Percent |
|---|---|
| Carbon | 0.16 |
| Silicon | 0.30 |
| Manganese | 1.30 |
| Phosphorus | 0.14 |
| Sulfur | 0.015 |
| Aluminum | 0.039 |
| Nickel | 0.28 |
| Balance iron. | |

This body was heated to a temperature above its $Ac_3$ transformation point and quenched in oil. The physical properties and notched weight impact strength were determined as before at a temperature of $-60°$ C. with the results given in Table II.

TABLE II

| Heat treatment | Physical properties | | | Notched bar impact strength (kgm./cm.²), distance from weld line (mm.) | | | | | |
|---|---|---|---|---|---|---|---|---|---|
| | $\sigma_a$ | $\sigma_B$ | $\sigma_5$ | 0 | 3 | 6 | 10 | 100 | |
| Rolled state | 38 | 57 | 28 | 3 | 2 | 4 | 4 | 9 | |
| Oil quenched | 44 | 60 | 29 | 6 | 6.5 | 8.5 | 8 | 8.5 | |

Similar results were obtained using low alloy steel containing 0.01 to 0.5% molybdenum, 0.005 to 0.2% vanadium, 0.1 to 1% chromium and 0.1 to 3.5% nickel.

We claim:

1. A method of fabricating a structure suitable for low temperatures, comprising the steps of heating bodies of a low-alloy or nonalloyed steel of the following composition by weight:

0.06 to 0.24% carbon
up to 0.60% silicon
0.40 to 1.60% manganese
up to 3.5% nickel
up to 1.0% chromium
up to 0.20% vanadium
up to 0.5% molybdenum and the balance iron and the usual impurities to a temperature at least equal to the upper $Ac_3$ transformation point; rapidly quenching the heated bodies in water or oil; and thereafter welding said bodies to form said structure.

2. The method defined in claim 1 wherein said steel has the following composition by weight:

| | Percent |
|---|---|
| Carbon | 0.10 |
| Silicon | 0.26 |
| Phosphorus | 0.014 |
| Sulfur | 0.016 |
| Aluminum | 0.012 |
| Manganese | 1.2 |
| Balance iron. | |

3. The method defined in claim 1 wherein said steel has the following composition by weight:

| | Percent |
|---|---|
| Carbon | 0.16 |
| Silicon | 0.30 |
| Manganese | 1.30 |
| Phosphorus | 0.014 |
| Sulfur | 0.015 |
| Aluminum | 0.039 |
| Nickel | 0.28 |
| Balance iron. | |

References Cited

UNITED STATES PATENTS

| 3,470,037 | 9/1969 | Suzuki | 148—127 |
| 3,388,988 | 6/1968 | Nagashima et al. | 148—36 X |
| 2,797,162 | 6/1957 | Korczynsky | 148—34 X |
| 3,216,823 | 11/1965 | Gulya et al. | 148—143 X |
| 2,586,042 | 2/1952 | Hodge et al. | 148—143 X |

FOREIGN PATENTS

| 1,225,681 | 9/1966 | Germany | 148—127 |

L. DEWAYNE RUTLEDGE, Primary Examiner
G. K. WHITE, Assistant Examiner

U.S. Cl. X.R.

148—34